United States Patent Office 3,082,237
Patented Mar. 19, 1963

3,082,237
2-CYCLOHEXENYL ESTERS OF HYDROGEN SUBSTITUTED DITHIOCARBAMIC ACIDS
John J. D'Amico, Charleston, W. Va., assignor to Monsanto Chemical Company, St. Louis, Mo., a corporation of Delaware
No Drawing. Filed Oct. 12, 1959, Ser. No. 845,601
7 Claims. (Cl. 260—455)

The present invention relates to a new class of dithiocarbamates and to fungicide compositions containing them. More particularly, the invention relates to 2-cyclohexenyl esters of hydrogen substituted dithiocarbamic acids.

The new compounds comprise the structure

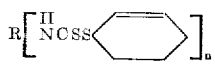

wherer R represents hydrogen, alkyl, halogen substituted alkyl, alkoxyalkyl, cyanoalkyl, alkenyl, cyclohexenyl, oxytrimethylene, alkylene or alkylenedioxytrimethylene and $n$ is 1 or 2. Examples of R comprise hydrogen and organic radicals containing 1 to 8 carbon atoms inclusive, as for example, methyl, ethyl, butyl, propyl, isopropyl, pentyl, isopentyl, hexyl, octyl, iso-octyl, heptyl, 3-ethoxypropyl, 3-methoxypropyl, 2-methoxyethyl, 2-methoxypropyl, 3-propoxypropyl, cyanoethyl, allyl, 2-methallyl, cyclohexenyl, —(CH$_2$)$_3$O(CH$_2$)$_3$—, trimethylene and —(CH$_2$)$_3$OC$_2$H$_4$O(CH$_2$)$_3$—. While the 2-cyclohexenyl radical is preferred, isomers thereof and middle halogen as well as lower alkyl substituted derivatives of cyclohexenyl radicals are contemplated. Suitable variables are 3-cyclohexenyl, 4-bromo-2-cyclohexenyl, 2-chloro-2-cyclohexenyl, 3-chloro-2-cyclohexenyl, 2-bromo-3-cyclohexenyl, 2-methyl-2-cyclohexenyl, 3-methyl-2-cyclohexenyl, 4-methyl-2-cyclohexenyl and 2-ethyl-2-cyclohexenyl.

Examples of the new compounds comprise

Bis(2-cyclohexenyl)-trimethylene bis(dithiocarbamate),
Bis(2-cyclohexenyl)-1-methyltrimethylene bis(dithiocarbamate),
Bis-(2-cyclohexenyl)-2-methyltrimethylene bis(dithiocarbamate),
Bis-(2-cyclohexenyl)-1-methoxytrimethylene bis(dithiocarbamate),
Bis-(2-cyclohexenyl)-2-methoxytrimethylene bis(dithiocarbamate),
2-cyclohexenyl dithiocarbamate,
2-cyclohexenyl methyldithiocarbamate,
2-cyclohexenyl ethyldithiocarbamate,
2-cyclohexenyl propyldithiocarbamate,
2-cyclohexenyl isopropyldithiocarbamate,
2-cyclohexenyl butyldithiocarbamate,
2-cyclohexenyl isobutyldithiocarbamate,
2-cyclohexenyl pentyldithiocarbamate,
2-cyclohexenyl isopentyldithiocarbamate,
2-cyclohexenyl hexyldithiocarbamate,
2-cyclohexenyl octyldithiocarbamate,
2-cyclohexenyl iso-octyldithiocarbamate,
2-cyclohexenyl allyldithiocarbamate,
2-cyclohexenyl 2-methallyldithiocarbamate,
2-cyclohexenyl 2-cyclohexenyldithiocarbamate,
2-cyclohexenyl 2-cyanoethyldithiocarbamate,
2-cyclohexenyl 2-methoxyethyldithiocarbamate,
2-cyclohexenyl 2-ethoxyethyldithiocarbamate,
2-cyclohexenyl chlorohexyldithiocarbamate,
2-cyclohexenyl chlorobutyldithiocarbamate,
2-cyclohexenyl chloropentyldithiocarbamate,
2-cyclohexenyl cyclohexyldithiocarbamate,
2-cyclohexenyl 3-methoxypropyldithiocarbamate,
2-cyclohexenyl 3-ethoxypropyldithiocarbamate,
2-cyclohexenyl 2-propoxyethyldithiocarbamate
and 2-cyclohexenyl 3-propoxypropyldithiocarbamate.

The following examples illustrate in detail the preparation and properties of some of the new products but are not to be taken as limitative.

EXAMPLE 1

The 3-bromocyclohexene required for this example was obtained by stirring for one hour at 70–78° C. 204 grams (3.7 moles) of cyclohexene, 136 grams (0.74 mole) of 97% N-bromosuccinimide and 555 ml. of carbon tetrachloride. The mixture was then cooled to 25° C. and filtered. Excess carbon tetrachloride and cyclohexene were removed by distillation at atmospheric pressure and the residue distilled in vacuo to obtain a fraction, B.P. 54–65° C./10 mm.

To a stirred solution of 17.5 grams (0.15 mole) of 3-propoxypropylamine, 25 grams of concentrated ammonium hydroxide in 150 ml. of ethyl alcohol was added at 20–25° C. 11.5 grams (0.15 mole) of carbon bisulfide. After stirring for an hour, 24.0 grams (0.15 mole) of 3-bromocyclohexene was added in one portion while maintaining the temperature at 20–25° C. The reaction mixture was stirred over night at room temperature, then 250 ml. of water and 250 ml. of ether added. The ether solution was washed with water until neutral to litmus and dried over sodium sulfate. The ether was removed in vacuo. The 2-cyclohexenyl 3-propoxypropyldithiocarbamate was obtained as an amber oil in 78% yield. Analysis gave 4.5% nitrogen and 22.2% sulfur as compared to 5.2% nitrogen and 23.4% sulfur calculated for $C_{13}H_{23}NOS_2$.

EXAMPLE 2

To a stirred solution containing 10.4 grams (0.1 mole) of 3-ethoxypropylamine, 12.6 grams (0.1 mole) of concentrated ammonium hydroxide and 100 ml. of ethyl alcohol was added dropwise at 5–15° C. 7.6 grams (0.1 mole) of carbon bisulfide. The mixture was stirred for an hour, then 16.1 grams (0.1 mole) of 3-bromocyclohexene was added in one portion. Stirring was continued at 25–30° C. for 24 hours, then 200 ml. of water and 400 ml. of ethyl ether added. After stirring for an additional 15 minutes, the ether solution was washed with water until neutral to litmus and dried over sodium sulfate. The ether was removed in vacuo at a maximum temperature of 80–90° C./1–2 mm. The 2-cyclohexenyl 3-ethoxypropyldithiocarbamate was obtained in 92.5% yield as an amber oil. Analysis gave 5.1% nitrogen and 24.6% sulfur as compared to 5.4% nitrogen and 24.7% sulfur calculated for $C_{12}H_{21}NOS_2$.

EXAMPLE 3

To a solution containing 17.6 grams (0.25 mole) of cyanoethylamine, 32 grams (0.5 mole) of concentrated ammonium hydroxide and 200 ml. of ethyl alcohol was added dropwise at 5–15° C. 19 grams (0.25 mole) of carbon bisulfide. The mixture was stirred at 25–30° C. for an hour and then 40.25 grams (0.25 mole) of 3-bromocyclohexene added in one portion. Stirring was continued at 25–30° C. for 24 hours, then 300 ml. of water added, the mixture stirred and cooled to 0–3° C. The precipitate which formed was collected by filtration, washed with water until neutral to litmus and air dried at 25–30° C. The 2-cyclohexenyl 2-cyanoethyldithiocarbamate was obtained in 91% yield as a yellow solid, M.P. 93–94° C. after recrystallization from ethyl alcohol. Analysis gave 11.9% nitrogen as compared to 12.4% calculated for $C_{10}H_{14}N_2S_2$.

EXAMPLE 4

To a stirred solution containing 17.6 grams (0.1 mole) of ethylene bis oxypropylamine, 25.2 grams (0.4 mole) of concentrated ammonium hydroxide and 200 ml. of water was added dropwise at 5–15° C. 15.2 grams (0.2 mole) of carbon bisulfide. After stirring for an hour at 25–30° C., 32.2 grams (0.2 mole) of 3-bromocyclohexene was added in one portion and stirring continued at 25–30° C. for 18 hours. The stirred reaction mixture was then extracted with 350 ml. of ethyl ether, the ether solution washed with water until neutral to litmus and dried over sodium sulfate. The ether was removed in vacuo at a maximum temperature of 80–90° C./1–2 mm. The bis(2 - cyclohexenyl)ethylenebis(oxytrimethylenedithiocarbamate) thus obtained was a viscous amber liquid. The yield was 71.8%. Analysis gave 5.4% nitrogen as compared to 5.7% calculated for $C_{22}H_{36}N_2O_2S_4$.

EXAMPLE 5

Substituting 13.6 grams (0.1 mole) of 97% bis(3-aminopropyl)ether for the amine in the preceding example and stirring the reaction mixture at 25–30° C. for 24 hours, bis(2-cyclohexenyl)-3,3′-oxybis(trimethylenedithiocarbamate) was obtained as a viscous amber oil. Analysis gave 5.4% nitrogen as compared to 6.3% calculated for $C_{20}H_{32}N_2OS_4$.

EXAMPLE 6

To a stirred solution containing 17.8 grams (0.25 mole) of 2-methallylamine, 32 grams (0.5 mole) of concentrated ammonium hydroxide and 250 ml. of water was added at 5–15° C. 19 grams (0.25 mole) of carbon bisulfide and stirring continued at 25–30° C. for an hour. Then 40.25 grams (0.25 mole) of 3-bromocyclohexene was added in one portion, the mixture stirred at 25–30° C. for 24 hours and then extracted with 400 ml. of ethyl ether. The ether solution was washed with water until neutral to litmus, dried over sodium sulfate and the ether removed in vacuo at a maximum temperature of 80–90° C./1–2 mm. The 2-cyclohexenyl 2-methallyldithiocarbamate, obtained in 61.5% yield, was an amber oil analyzing 5.2% nitrogen as compared to 6.2% calculated for $C_{11}H_{17}NS_2$.

By a similar procedure, substituting the appropriate amines, the following compounds were prepared. They were all amber oils.

| Example No. | Structural Formula | Yield, percent | Analysis, Percent | | |
|---|---|---|---|---|---|
| | | | | Calcd. | Found |
| 7 | $CH_3NHCSS$—⬡ | 64.1 | N | 7.5 | 6.3 |
| 8 | ⬡—$NHCSS$—⬡ | 61.5 | N | 5.5 | 5.0 |
| 9 | $(CH_3)_2CHCH_2CH_2NHCSS$—⬡ | 80.6 | N | 5.7 | 5.3 |
| 10 | $CH_3CH_2CH_2NHCSS$—⬡ | 63.4 | N | 6.5 | 5.4 |
| 11 | $(CH_3)_2CH(CH_2)_5NHCSS$—⬡ | 84.2 | N / S | 4.9 / 22.5 | 4.9 / 21.6 |
| 12 | $C_2H_5NHCSS$—⬡ | 53.7 | N | 7.0 | 6.8 |
| 13 | $CH_3(CH_2)_5NHCSS$—⬡ | 76.4 | N / S | 5.4 / 24.9 | 5.2 / 24.3 |
| 14 | $CH_2=CHCH_2NHCSS$—⬡ | 60.5 | N | 6.6 | 5.6 |
| 15 | $C_5H_{11}NHCSS$—⬡ | 60.0 | N | 5.4 | 6.0 |
| 16 | $C_4H_9NHCSS$—⬡ | 70.0 | N | 6.1 | 5.3 |

EXAMPLE 17

To a stirred solution containing 17.4 grams (0.15 mole) of 2-methoxyethylamine, 15 grams of concentrated ammonium hydroxide and 100 ml. of ethyl alcohol was added dropwise at 5–20° C. 11.5 grams (0.15 mole) of carbon bisulfide. After stirring for one hour at 25–30° C., 24.0 grams (0.15 mole) of 3-bromocyclohexene was added in one portion and stirring continued at 25–30° C. for 24 hours. Then 100 ml. of water and 300 ml. of ethyl ether were added to the mixture and stirring continued for 15 minutes. The ether layer was washed with water until neutral to litmus, dried over sodium sulfate and the ether removed in vacuo at a maximum temperature of 30° C./1–2 mm. The 2-cyclohexenyl 2-methoxyethyldithiocarbamate was obtained in 89.3% yield as an amber oil analyzing 6.1% nitrogen as compared to 6.1% calculated for $C_{10}H_{17}NOS_2$.

EXAMPLE 18

Substituting 3-methoxypropylamine in Example 17, 2-cyclohexenyl 3-methoxypropyldithiocarbamate was obtained in 65.5% yield as an amber oil analyzing 5.1% nitrogen as compared to 5.7% calculated for $C_{11}H_{19}NOS_2$.

EXAMPLE 19

To a stirred slurry containing 33 grams (0.3 mole) of ammonium dithiocarbamate and 200 ml. of ethyl alcohol was added dropwise at 5–10° C. in 30 minutes 32.2 grams (0.2 mole) of 3-bromocyclohexene. After stirring for 1 hour at 0–10° C. and for 24 hours at 25–30° C., 200 ml. of water and 400 ml. of ethyl ether were added and stirring continued for 15 minutes. The ether layer was washed with water until neutral to litmus, dried over sodium sulfate and the ether removed in vacuo at a maximum temperature of 80–90° C./2–4 mm. The 2-cyclohexenyl dithiocarbamate thus obtained was a viscous amber oil analyzing 36.7% sulfur as compared to 37.0% calculated for $C_7H_{11}NS_2$.

EXAMPLE 20

To a stirred mixture containing 79.1 grams (0.25 mole) of a 50% aqueous solution of chloropentylamine hydrochloride, 80 grams (0.5 mole) of 25% sodium hydroxide and 200 ml. of water was added dropwise at 5–15° C. 19.0 grams (0.25 mole) of carbon bisulfide and stirring continued at 25–30° C. for an hour. Next there was added in one portion 32.2 grams (0.2 mole) of 3-bromocyclohexene and the mixture stirred at 25–30° C. for 18 hours. The stirred reaction mixture was then extracted with 400 ml. of ethyl ether. The ether solution was washed with water until neutral to litmus, dried over sodium sulfate and the ether removed in vacuo at a maximum temperature of 80–90° C./1–2 mm. The 2-cyclohexenyl chloropentyldithiocarbamate was obtained as a viscous amber oil in 56% yield. Analysis gave 5.4% nitrogen as compared to 5.0% calculated for $$C_{12}H_{20}ClNS_2$$

The new compounds are useful for destroying fungi, a property which they retain in the presence of soil, whereas many otherwise effective fungicides lost their activity in the presence of soil. This property was demonstrated by infesting soil with "damping off" fungi, treating the infested soil with the test material, incubating for 24 hours and sowing seeds in the incubated soil and assessing disease incidence after 10–14 days. A stock solution of the test material was pipetted into a glass jar containing one pound of infested soil. A concentration of 100 parts per million of chemical in the soil corresponds to a dosage of 200 pounds per acre. Application within the range of 10 to 500 pounds per acre encompasses the rate of application suitable for practical control of pathogenic organisms in most cases. The "damping off" fungi present were principally Pythium, Rhizoctonia and Fusarium species. The jar was sealed and the contents thoroughly mixed by vigorous shaking. The treated soil was incubated at room temperature for 24 hours, transferred to clay pots and 15 seeds of each of 2 crop plants sown in each pot. The crop plants were Delta Pine No. 15 cotton and Straight Eight cucumber. The seeded pots were then incubated at 70° F. at 98% humidity to insure activity of the organisms in the soil. 24 hours later the pots were removed to a greenhouse and disease assessments made within 10–14 days. The percent emergence and disease incidence were recorded. The ratings were based on results with inoculated, untreated soil and with uninoculated, sterile soil. For convenience in recording the data, the following rating scale was used.

| Rating: | Healthy plants out of 30 |
|---|---|
| E | 26–30 |
| P | 19–25 |
| F | 13–18 |
| N, not effective | <13 |

The results are recorded below:

*Table I*

| Toxicant | Soil Fungicide Rating (Pounds per Acre) | | |
|---|---|---|---|
| | 200 | 60 | 20 |
| 2-Cyclohexenyl 2-cyanoethyldithiocarbamate | P | P | P |
| 2-Cyclohexenyl 2-methallyldithiocarbamate | P | P | P |
| 2-Cyclohexenyl methyldithiocarbamate | E | F | N |
| 2-Cyclohexenyl 2-cyclohexenyldithiocarbamate | P | F | N |
| 2-Cyclohexenyl isopentyldithiocarbamate | P | F | N |
| 2-Cyclohexenyl propyldithiocarbamate | P | N | |
| 2-Cyclohexenyl iso-octyldithiocarbamate | P | F | F |
| 2-Cyclohexenyl ethyldithiocarbamate | P | P | N |
| 2-Cyclohexenyl hexyldithiocarbamate | P | F | N |
| 2-Cyclohexenyl allyldithiocarbamate | F | N | |
| 2-Cyclohexenyl pentyldithiocarbamate | P | P | |
| 2-Cyclohexenyl butyldithiocarbamate | P | P | |
| 2-Cyclohexenyl 3-ethoxypropyldithiocarbamate | E | N | |
| Bis-(2-cyclohexenyl)ethylenebis(oxytrimethylene-dithiocarbamate) | P | N | |
| Bis-(2-cyclohexenyl)oxytrimethylene-bis(dithiocarbamate) | P | P | N |
| 2-Cyclohexenyl 3-propoxypropyldithiocarbamate | E | N | |
| 2-Cyclohexenyl 3-methoxyethyldithiocarbamate | E | N | |
| 2-Cyclohexenyl 3-methoxypropyldithiocarbamate | E | N | |
| 2-Cyclohexenyl chloropentyldithiocarbamate | P | | F[1] |

[1] 6 pounds per acre.

From the results it will be noted that cyclohexenyl esters constitute an effective class of soil fungicides.

The compounds may be applied to soil in a variety of forms. They are, for the most part, oils insoluble in water but may be readily dispersed or emulsified in water by use of emulsifying agents. It is ordinarily most convenient to apply the compounds with an aqueous carrier. They are soluble in common organic solvents and, if desired, may be applied in an organic vehicle or the solution in an organic solvent applied as an emulsion. Alternatively, the compounds may be adsorbed on finely divided or granular carriers, as for example clay, pyrophyllite, silica and fuller's earth. Excellent results are obtained by applying the compound and carrier to the surface of soil but it is preferable to work the composition into the top few inches of the soil.

It is intended to cover all changes and modifications of the examples of the invention herein chosen for purposes of disclosure which do not constitute departures from the spirit and scope of the invention.

What is claimed is:
1. A compound of the structure

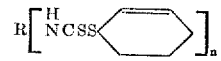

where R is selected from the group consisting of hydrogen and organic radicals containing 1 to 8 carbon atoms inclusive, said organic radicals being selected from the group consisting of alkyl, chloroalkyl, cyanoalkyl, alkoxyalkyl, —$(CH_2)_3O(CH_2)_3$—, alkylene, —$(CH_2)_3OC_2H_4O(CH_2)_3$—, cyclohexyl and 2-cyclohexenyl and $n$ is one of the integers 1 and 2 being 1 except where R is —$(CH_2)_3O(CH_2)_3$—, alkylene and —$(CH_2)_3OC_2H_4O(CH_2)_3$—.

2. A compound of the structure

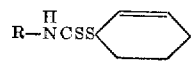

where R is an alkyl group of 1–8 carbon atoms inclusive.

3. A compound of the structure

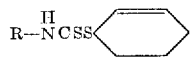

where R is a 2-cyclohexenyl group.

4. 2-cyclohexenyl iso-octyldithiocarbamate.
5. 2-cyclohexenyl 2-cyanoethyldithiocarbamate.
6. 2-cyclohexenyl 2-methallyldithiocarbamate.
7. 2-cyclohexenyl 2-cyclohexenyldithiocarbamate.

References Cited in the file of this patent

UNITED STATES PATENTS

| | | |
|---|---|---|
| 2,060,733 | Hunt et al. | Nov. 10, 1936 |
| 2,160,880 | Loane et al. | June 6, 1939 |
| 2,756,249 | Kirshenbaum et al. | July 24, 1956 |
| 2,854,467 | Harman et al. | Sept. 30, 1958 |
| 2,889,245 | Bonrath et al. | June 2, 1959 |
| 2,911,336 | Urbschat et al. | Nov. 3, 1959 |

UNITED STATES PATENT OFFICE
CERTIFICATE OF CORRECTION

Patent No. 3,082,237                            March 19, 1963

John J. D'Amico

It is hereby certified that error appears in the above numbered patent requiring correction and that the said Letters Patent should read as corrected below.

Column 1, line 21, for "wherer" read -- where --; column 4, in the table, opposite "Example No. 14", for "6 6" read -- 6.6 -- column 6, line 66, before "-$(CH_2)_3 O(CH_2)_3$-" insert -- alkenyl --.

Signed and sealed this 12th day of November 1963.

(SEAL)
Attest:

ERNEST W. SWIDER                          EDWIN L. REYNOLDS

Attesting Officer                          Acting Commissioner of Patents